M. HEBERT.
NUT LOCK.
APPLICATION FILED JULY 29, 1915.
1,201,464.
Patented Oct. 17, 1916.
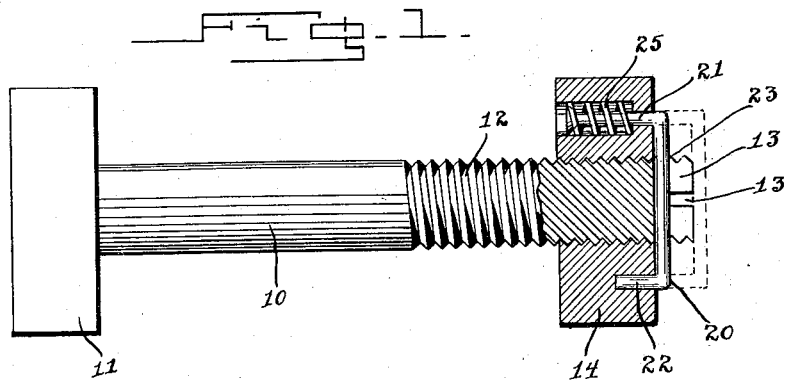
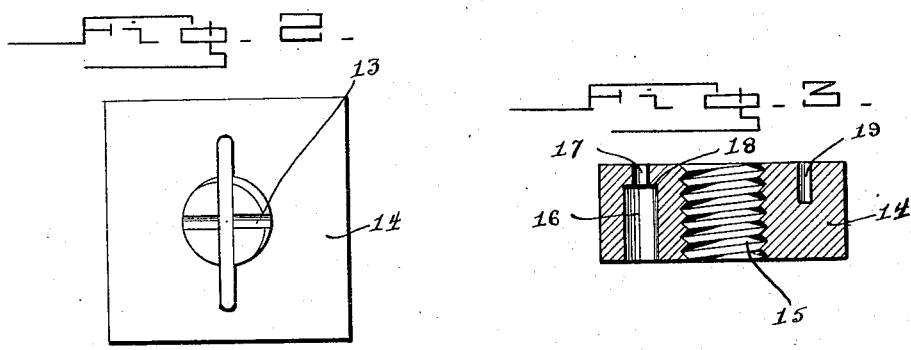
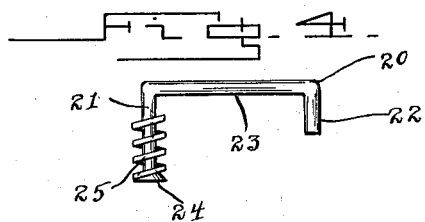
Inventor
Mark Hebert
Witnesses
Francis Ph. O'Reilly
Wade Koontz
By Richard Owen,
Attorney

UNITED STATES PATENT OFFICE.

MARK HEBERT, OF WORCESTER, MASSACHUSETTS.

NUT-LOCK.

1,201,464.　　　　　Specification of Letters Patent.　　Patented Oct. 17, 1916.

Application filed July 29, 1915. Serial No. 42,615.

*To all whom it may concern:*

Be it known that I, MARK HEBERT, a citizen of the United States, residing at Worcester, in the county of Worcester and State of Massachusetts, have invented certain new and useful Improvements in Nut-Locks, of which the following is a specification.

This invention relates to nut locks and the object of the same is to provide an improved form of nut locking means that will positively secure the nut from accidental rotation but which will, however, allow the same to be quickly and easily released so that it can be removed at will.

Another object of this invention resides in the provision of a nut adapted to be used in connection with a bolt provided with a plurality of intersecting transversely extending slots, the nut having a spring controlled member carried thereby for insertion in the slots to prevent the independent rotation of the nut upon the bolt.

A still further object is to provide a device that is simple in construction, efficient in operation, and consists of a minimum number of parts.

With these and other objects in view, this invention resides in certain novel features of construction, combination and arrangement of parts, as will be hereinafter more fully described and claimed and shown in the accompanying drawings wherein:—

Figure 1 is a view in elevation of the bolt showing a portion of the same and the improved nut mounted thereon in section; Fig. 2 is a top plan view of the device as shown in Fig. 1; Fig. 3 is a transverse sectional view; Fig. 4 is a view in elevation of the improved locking means used with this device.

Referring to the parts by reference numerals, a bolt is designated by the numeral 10, having a head 11 at one end thereof and a threaded portion 12 at the opposite end, the said portion 12 provided with transversely extending intersecting slots 13. A nut 14 is provided with the usual internally threaded bore 15 and a second bore 16 that has one end thereof 17 reduced, forming the abutment shoulder 18. Diametrically opposite the bore 16 is formed in the nut, a socket 19 for a purpose that will be hereinafter set forth. A locking key used with this device is designated in its entirety by the numeral 20, the same comprising a substantially long arm 21 and a substantially short arm 22, and a bridge connecting portion 23. At one end of the substantially long arm 21, is formed a head 24 and a coil spring 25 is secured around the arm 21 and one end of the same is in engagement with the head 24.

As is clearly shown in Fig. 1, the arm 21 of the key 20 is placed in the bore 16 and the coil spring 25 has one end thereof in engagement with the shoulder 18 and as has been heretofore set forth, the other end in engagement with the head 25 and the relatively shorter arm 22 is positioned in the socket 19 and the connecting bridge 23 spanning the bore 15 in the nut. The coil spring 25 retains the locking key in a position as shown in Fig. 1 that is, position the bridge 23 in engagement with the outer face of the nut 14 and thus when the nut is threaded on the bolt to the desired position, the arm 23 will be inserted in one of the transversely extending slots 13 and thus the independent rotation of the nut upon the bolt is prevented, it being understood that while the nut is being rotated upon the bolt, the key 20 can be moved against the tension of the spring 25, to a position as indicated in Fig. 1; furthermore, when it is wished to remove the nut from the bolt, the same can be easily accomplished by moving the locking key 20 against tension of the spring so as to remove the bridge 23 from one of the slots 13.

It is obvious that minor changes may be made in the form and construction of this device without departing from the material parts thereof. It is, therefore, not wished to confine the invention to the exact form and construction herein shown and claimed but it is wished to include all such as properly come within the scope claimed.

What is claimed is:—

In a nut lock, the combination with a bolt having a plurality of intersecting transversely extending slots, a nut threaded on said bolt having a bore formed therein, a locking key including a pair of arms, a connecting bridge for said arms, adapted to span one end of said bolt to engage in certain of said slots in said bolt and a spring means incased in said bore so as to normally retain said bridge in engagement with said bolt by engagement with one of said arms that is positioned in said bore to prevent the independent rotation of said nut on said bolt.

In testimony whereof I affix my signature in presence of two witnesses.

MARK HEBERT.

Witnesses:
OMER W. GAUTHIER,
GLEASON C. WILDER.

Copies of this patent may be obtained for five cents each, by addressing the "Commissioner of Patents, Washington, D. C."